United States Patent
Afanasiev et al.

(10) Patent No.: US 9,765,256 B2
(45) Date of Patent: Sep. 19, 2017

(54) POLYMER PROPPANT AND METHOD FOR PRODUCING SAME

(71) Applicant: ROSNEFT OIL COMPANY, Moscow (RU)

(72) Inventors: Vladimir Vladimirovich Afanasiev, Moscow (RU); Sergey Anatolievich Alkhimov, Moscow (RU); Nataliya Borisovna Bespalova, Moscow (RU); Tatyana Modestovna Yumasheva, Moscow (RU)

(73) Assignee: ROSNEFT OIL COMPANY, Moscow (RU)

( * ) Notice: Subject to any disclaimer, the term of this patent is extended or adjusted under 35 U.S.C. 154(b) by 0 days.

(21) Appl. No.: 14/786,623

(22) PCT Filed: May 13, 2014

(86) PCT No.: PCT/RU2014/000339
§ 371 (c)(1),
(2) Date: Oct. 23, 2015

(87) PCT Pub. No.: WO2014/193267
PCT Pub. Date: Dec. 4, 2014

(65) Prior Publication Data
US 2016/0130498 A1    May 12, 2016

(30) Foreign Application Priority Data

May 31, 2013 (RU) .................. 2013125246

(51) Int. Cl.
*C09K 8/80*    (2006.01)
*C08F 32/06*    (2006.01)
*C08F 132/06*    (2006.01)

(52) U.S. Cl.
CPC ............... *C09K 8/80* (2013.01); *C08F 32/06* (2013.01); *C08F 132/06* (2013.01)

(58) Field of Classification Search
None
See application file for complete search history.

(56) References Cited

U.S. PATENT DOCUMENTS

| 4,068,718 | A | 1/1978 | Cooke, Jr. et al. |
| 4,668,645 | A | 5/1987 | Khaund |
| 7,931,087 | B2 | 4/2011 | Gupta |
| 2012/0145390 | A1 | 6/2012 | Parse et al. |
| 2012/0205101 | A1 | 8/2012 | Pribytkov et al. |
| 2012/0247335 | A1 | 10/2012 | Stutzman et al. |
| 2013/0045901 | A1 | 2/2013 | Bicerano |

FOREIGN PATENT DOCUMENTS

| EA | 000643 B1 | 12/1999 |
| RU | 2168518 C2 | 6/2001 |
| RU | 2386025 C1 | 4/2010 |
| RU | 2402572 C1 | 10/2010 |
| RU | 2465286 C2 | 10/2012 |

*Primary Examiner* — John J Figueroa
(74) *Attorney, Agent, or Firm* — Mintz Levin Cohn Ferris Glovsky and Popeo, P.C.

(57) ABSTRACT

The polymer proppant and method for producing the same relate to oil and gas production technology using materials of high-molecular weight compounds with higher requirements for physical and mechanical properties. The proppant is used as propping granules utilized in the oil and gas production by a method of hydraulic fracturing of formation. The technical result achieved by implementation of the present invention is an increase in thermal strength of the proppant whose material provides a compressive strength of at least 150 MPa at a temperature of not less than 100° C. The polymer proppant represents microspheres of metathesis-radically cross-linked mixture of oligocyclopentadienes.

2 Claims, No Drawings

POLYMER PROPPANT AND METHOD FOR PRODUCING SAME

This application is a U.S. national-phase entry of Patent Cooperation Treaty Application No. PCT/RU2014/000339, which has an international filing date of May 13, 2014, and claims the priority of Russian Patent Application No. 2013125246, filed May 31, 2013. The specifications, claims, and figures of both the PCT and Russian applications are incorporated herein by reference in their entireties.

TECHNICAL FIELD

The invention relates to the oil and gas production technology using materials based on high-molecular weight compounds, namely, to proppants made of polymer materials with increased requirements for physical and mechanical properties, used as propping granules in the oil and gas production by a technique of hydraulic fracturing of formation.

BACKGROUND ART

A method of hydraulic fracturing of formation (HFF) consists in high pressure pumping a fluid into oil- and gas-bearing formations, thus facilitating the creation of fractures in the formation through which the oil or gas is flowing. To prevent the fracture healing, hard particles, generally, spherical pellets/granules called as proppants that fill the created fractures together with the carrier fluid, are admixed into the fluid being pumped. The proppants should withstand high formation pressures, be resistive to aggressive environments, and retain the physical and mechanical properties at high temperatures. Meanwhile, the proppant should have a density close to the carrier fluid density in order to be present in the fluid in suspended state and to be delivered to most remote fracture sites. Taking into account that water is most frequently used as the fluid for hydraulic fracturing, the proppant density should be close to the water density.

Mineral materials of the natural origin, such as bauxites, kaolins and sands, are frequently used as an initial material for the production of proppants (U.S. Pat. Nos. 4,068,718 and 4,668,645).

It is known to use various materials, such as a borosilicate or calcinated glass, ferrous and non-ferrous metals or alloys thereof, metal oxides, oxides, nitrides and carbides of silicon, for the production of proppants having a shape of hollow pellets (US patent application No. 2012/0145390).

Disadvantages of these materials are a high technological complexity of production of the hollow pellets therefrom, their insufficient compression strength due to the hollow structure and the material fragility, a high degree of proppant breakdown in fractures, and a reverse carry-over of particles and their fragments.

Technical solutions for the production of proppants with a polymeric coating are aimed at the removal of such disadvantages. Such cover works as a compensator of point stresses, thereby more uniformly distributing the pressure throughout the proppant surface and volume, and, moreover, reduces the average proppant density. Widely known is the use of various organic polymeric and non-organic proppant coatings in the form of epoxy and phenol resins (US patent applications Nos. 2012/0205101, 2012/247335).

Disadvantages of these technical solutions are the complexity of producing such proppants, insufficient thermal resistance of the coatings, low ovality and sphericity factors due to the shape of mineral proppant core, and a high spread of physical and mechanical characteristics.

It is known to use a wide spectrum of thermosetting polymers with cross-linkages such as epoxy, vinyl and phenol compounds, polyurethane, polyester, melamine, etc., as the material for producing proppants (US patent application No. 2013/0045901).

Known is the use of polyamide as the material for producing proppants (U.S. Pat. No. 7,931,087).

A disadvantage of the known materials is an inconformity of physical and mechanical properties of these materials simultaneously with the entire combination of requirements applicable to proppant materials. For instance, this is referred to an insufficient resistance to aggressive environments, an insufficient thermal resistance and thermal strength, degree of swelling in liquid hydrocarbons media, compression strength.

A closest technical solution to the proposed one is the use of polydicyclopentadiene as the material for proppant (RU patent No. 2386025).

Disadvantage of the use of polydicyclopentadiene is an insufficient temperature resistance and compressive strength.

DISCLOSURE OF THE INVENTION

An objective of the present invention is to obtain a proppant having a set of properties required for the proppants operating in heavy conditions.

A technical result achieved by implementation of the present invention consists in improving the thermal strength of a proppant whose material provides a compressive strength of at least 150 MPa at a temperature of not lower than 100° C.

The technical result is achieved by that the polymer proppant represents microspheres of metathesis-radically cross-linked mixture of oligocyclopentadienes and produced by a method including obtaining a mixture of oligocyclopentadienes by heating dicyclopentadiene to a temperature of 150-220° C. and holding at this temperature for 15-360 minutes, cooling the mixture down to 20-50° C., sequentially adding the following components to the resulting mixture of oligocyclopentadienes: at least one of polymer stabilizers as which the following compounds are used: tetrakis[methylene(3,5-di-tert-butyl-4-hydroxyhydrocinnamate)]methane (1010), 2,6-di-tert-butyl-4-(dimethylamino)phenol (703), 1,3,5-trimethyl-2,4,6-tris(3,5-di-tert-butyl-4-hydroxybenzyl)benzene (330), tris(4-tert-butyl-3-hydroxy-2,6-dimethylbenzyl)isocyanurate (14), 3,5-di-tert-butyl-4-hydroxyanisole (354), 4,4'-methylenebis(2,6-di-tert-butylphenol) (702), diphenylamine (DPA), para-di-tert-butylphenylenediamine (5057), N,N'-diphenyl-1,4-phenylenediamine (DPPD), tris(2,4-di-tert-butylphenyl)phosphite (168), tris(nonylphenyl)phosphite (TNPP), bis(2,2,6,6-tetramethyl-4-piperidinyl)sebacate (770), bis(1-octyloxy-2,2,6,6-tetramethyl-4-piperidinyl)sebacate (123), bis(1-methyl-2,2,6,6-tetramethyl-4-piperidinyl)sebacate (292), 2-tert-butyl-6-(5-chloro-2H-benzotriazol-2-yl)-4-methylphenol (327), 2-(2H-benzotriazol-2-yl)-4,6-bis(1-methyl-1-phenyl)phenol (234); at least one of radical initiators selected from the group: di-tert-butyl peroxide (B), dicumyl peroxide (BC-FF), 2,3-dimethyl-2,3-diphenylbutane (30), triphenylmethane (TPM); and a catalyst as which a compound of the following general formula is used:

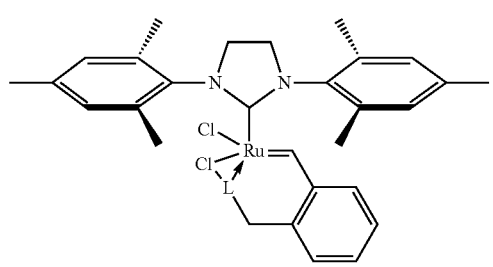
wherein a substituent L is selected from the group:
N N1
N(CH₃)₂ 
N N2
N(C₂H₅)₂
N N3
pyrrolidine
N N4
N(CH₃)(C₂H₅)
N N5
N(CH₃)(CH₂)₂OMe
N5b
morpholine
N1a
N6a
N11a
N16a
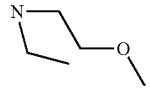
-continued
N1b
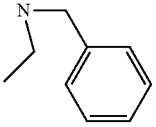
N2a
N7a
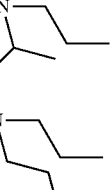
N12a
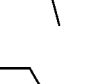
N17a
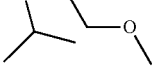
N2b
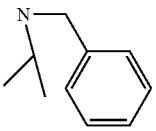
N3a
N8a
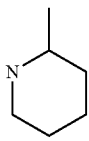
N13a
N18a
N3b
N4a
N9a
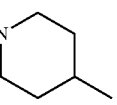

-continued

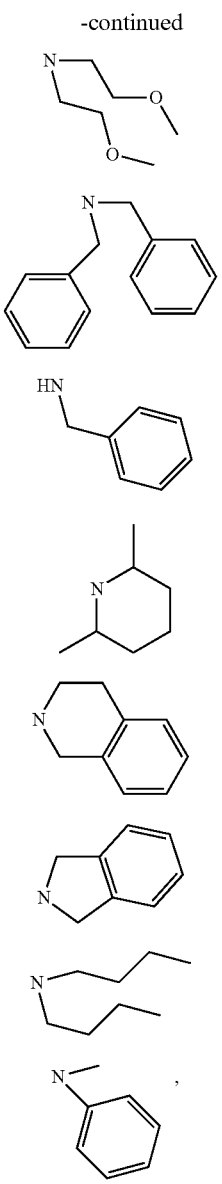

N14a

N19a

N4b

N5a

N10a

N15a

N20a

N1c the resulting polymer matrix is held at a temperature of 20-50° C. for 1-40 minutes, and thereafter is introduced as a laminar flow into water containing a surfactant and preheated to a temperature not lower than that of the matrix, while constantly stirring the water; microspheres formed are separated from the water, are heated under an inert gas atmosphere to a temperature of 150-340° C. and are held under said atmosphere at this temperature for 1-360 minutes. Cetyltrimethylammonium chloride or sodium dodecyl sulfate or ammonium lauryl sulfate or sodium lauryl sarcosinate or octenidine hydrochloride or benzalkonium chloride are used as the surfactant. The components of the polymer matrix are present in the following amounts, wt. %:
the polymer stabilizers 0.1-3;
the radical initiators 0.1-4;
the catalyst 0.001-0.02;
the mixture of oligocyclopentadienes being the balance.
These characteristic features are essential.

The metathesis-radically cross-linked mixture of oligocyclopentadienes forms a polymer which contains, in its chain, bulkier radically cross-linked polymer units than just polydicyclopentadiene that has a completely different structure. This provides the new polymer with a unique set of physical and mechanical properties distinguishing it from polydicyclopentadiene by higher values of glass transition temperature and compressive strength, and by stability in petroleum products. Addition of high-temperature radical polymerization initiators to the monomer mixture for obtaining polyoligocyclopentadiene can significantly improve thermo-mechanical performance of the materials and increase the chemical resistance of the polymer. The metathesis-radically cross-linked polyoligocyclopentadiene obtained by using simultaneously metathesis catalysts and radical initiators has a substantially higher glass transition temperature which is within the range of 190-320° C., better mechanical characteristics as compared to the polymer made only of dicyclopentadiene. A tensile strength increases up to 150-220 MPa, and a linear thermal expansion coefficient value is reduced. An extremely important property is the resistance to organic solvents. The percentage of swelling in toluene does not exceed 5% after holding for a month. In comparison to polydicyclopentadiene, the metathesis-radical cross-linked polyoligocyclopentadiene has a significantly greater compressive strength at a temperature of not less than 100° C., which is especially important for proppants.

BEST MODE FOR CARRYING OUT THE INVENTION

The polymer proppant is produced as follows.
A mixture of oligocyclopentadienes is produced by heating dicyclopentadiene to a temperature of 150-220° C. and holding thereof at this temperature for 15-360 minutes.

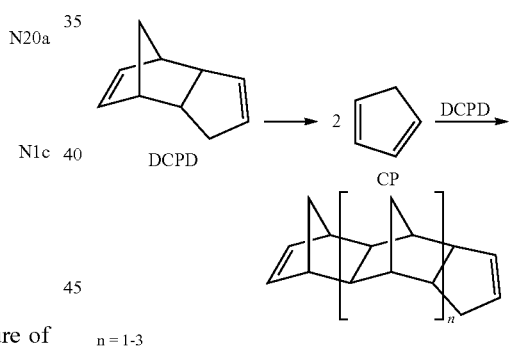

n = 1-3

The mixture of oligomers is cooled down to 20-50° C., and polymer stabilizers, radical initiators and a catalyst are successively added thereto. A polymer matrix is thereby obtained with the following composition, wt. %:
the polymer stabilizers 0.1-3;
the radical initiators 0.1-4;
the catalyst 0.001-0.02;
the mixture of oligocyclopentadienes being the balance.

The polymer matrix is held at a temperature of 0-50° C. for 1-40 minutes, and thereafter is introduced as a laminar flow into water containing a surfactant and preheated to a temperature not lower than that of the matrix, while constantly stirring the water. The water is heated up to 50-100° C., while still continuing stirring for 1-60 minutes. During the stirring process, a metathesis polymerization of the matrix occurs to form the microspheres. Polymerization of the oligomers of cyclopentadiene proceeds according to the following scheme:

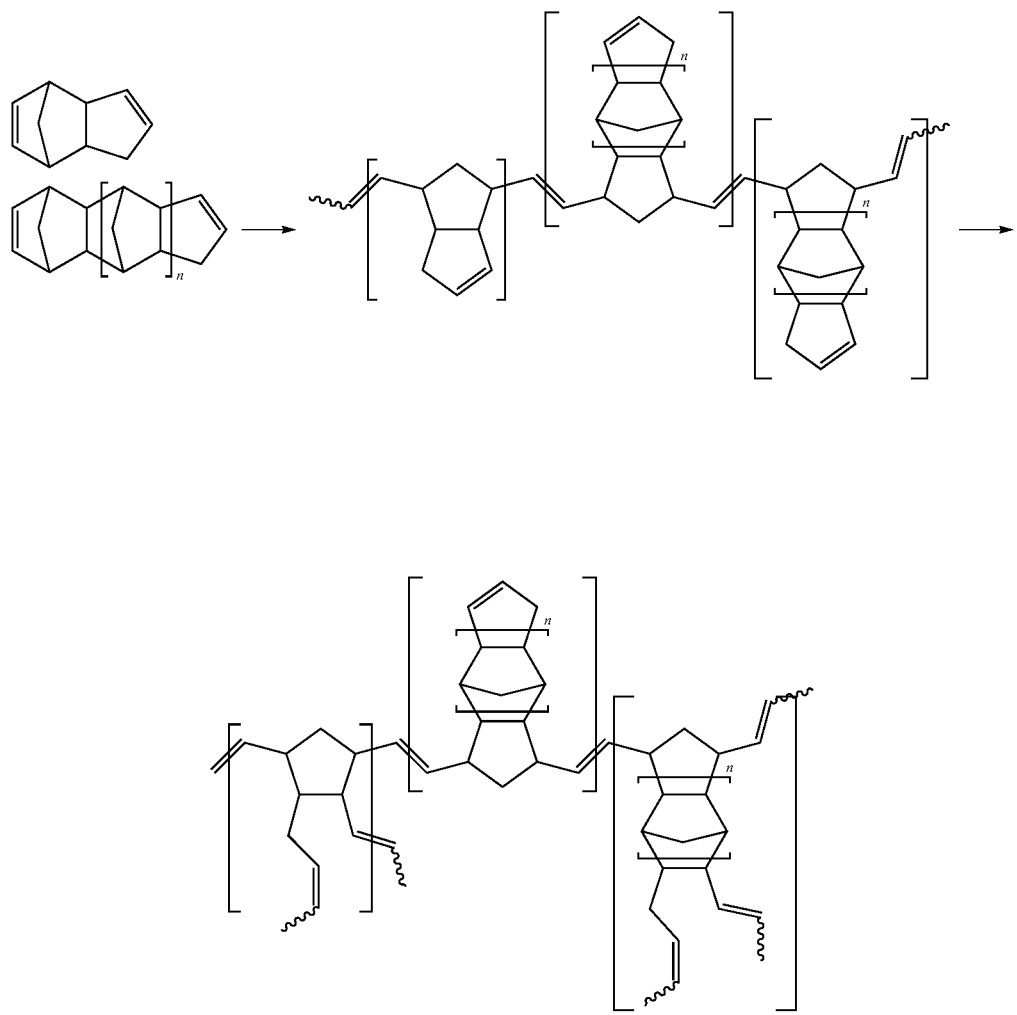
n = 1-3.
The microspheres formed are separated from the liquid, are heated up to a temperature of 150-340° C. under an inert gas atmosphere and are held under said atmosphere at this temperature for 1-360 minutes. During the process of heating and holding at this temperature, radical cross-linking of the polymer occurs as follows:
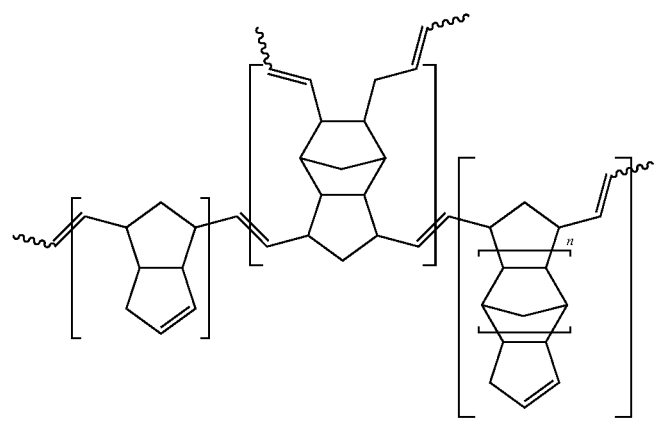

-continued

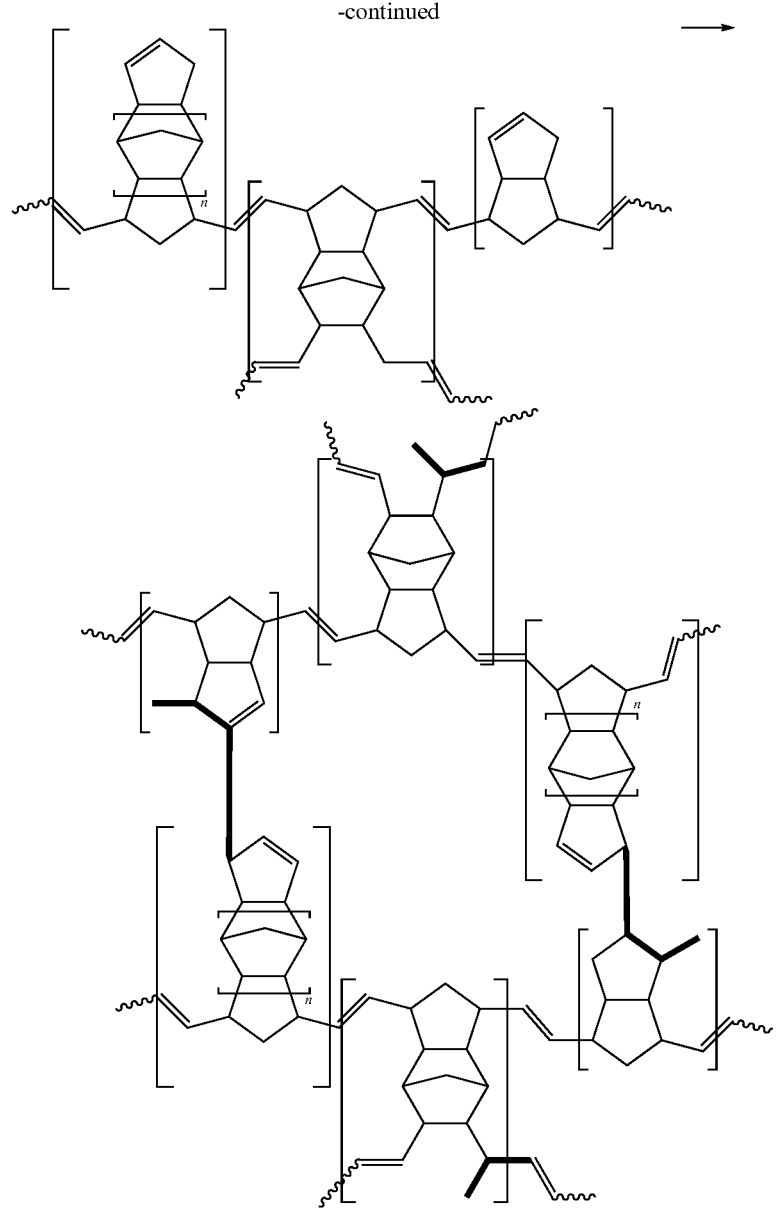

n = 1-3.

The heating of the microspheres under an inert gas atmosphere prevents them from oxidation and destruction. It is preferable to use nitrogen or argon as the inert gas.

The properties of the proppant material are classified by the following characteristics:
Glass transition temperature (Tg)
A more than 250° C.
B 201 to 250° C.
C 170 to 200° C.
D less than 170° C.
Compressive strength, MPa
A more than 220
B 170 to 219
C 120 to 169
Target fraction (0.1-1.5 mm), %
A more than 77
B 74 to 77
C 70 to 74
Swelling in oil (100° C./1 week), %
A less than 1
B 1.1 to 3
C 3.1 to 5.

EXAMPLE EMBODIMENTS OF THE INVENTION

Example 1

Dicyclopentadiene is heated in an autoclave to 170° C., is held at the predetermined temperature for 60 minutes, and is cooled down to room temperature. Polymer stabilizers 1010 (0.30 wt. %), 168 (0.40 wt. %) and 770 (0.40 wt. %), and radical initiators B (2.0 wt. %), 30 (2.0 wt. %) are added to the resulting mixture. Catalyst N3a (0.0278 wt. %) is added at 25° C. The resulting mixture is stirred for 10 minutes, and thereafter is introduced as a laminar flow into water (a polymer mixture/water-and-surfactant ratio being 0.2) containing a surfactant of sodium dodecyl sulfate (0.2 wt. %) at 40° C. While constantly stirring, the water is heated up to 100° C. and is held for 10 minutes. Microspheres are separated from the water, are heated up to 260° C. and are held at this temperature under nitrogen atmosphere for 40 minutes. The microspheres thereby produced are as follows: yield of 97%, average size (B), Tg (B), compressive strength (B), sphericity of 0.9, bulk density of 0.6 g/cm$^3$, and swelling (B).

Example 2

Dicyclopentadiene is heated in an autoclave to 160° C., is held at the predetermined temperature for 60 minutes, and is cooled down to room temperature. Polymer stabilizers 330 (0.50 wt. %) and 168 (0.50 wt. %), and a radical initiator B (0.1 wt. %) are added to the resulting mixture. Catalyst N (0.0096 wt. %) is added at 35° C. The resulting mixture is stirred for 40 minutes, and thereafter is introduced as a laminar flow into water (a polymer mixture/water-and-surfactant ratio being 0.1) containing a surfactant of sodium lauryl sarcosinate (0.1 wt. %) at 35° C. While constantly stirring, the water is heated up to 100° C. and is held for 1 minute. Microspheres are separated from the water, are heated up to 200° C., and are held at this temperature under nitrogen atmosphere for 30 minutes. The microspheres thereby produced are as follows: yield of 94%, average size (A), Tg (C), compressive strength (B), sphericity of 0.9, bulk density of 0.6 g/cm$^3$, and swelling (C).

Example 3

Dicyclopentadiene is heated in an autoclave to 155° C., is held at the predetermined temperature for 240 minutes, and is cooled down to room temperature. Polymer stabilizers 1010 (0.40 wt. %), 168 (0.40 wt. %) and 770 (0.50 wt. %), and a radical initiator BC-FF (1.5 wt. %) are added to the resulting mixture. Catalyst N7a (0.0072 wt. %) is added at 25° C. The resulting mixture is stirred for 10 minutes, and thereafter is introduced as a laminar flow into water (a polymer mixture/water-and-surfactant ratio being 0.3) containing a surfactant of cetyltrimethylammonium chloride (0.3 wt. %) at 40° C. While constantly stirring, the water is heated up to 100° C. and is held for 15 minutes. Microspheres are separated from the water, are heated up to 150° C., and are held at this temperature under nitrogen atmosphere for 20 minutes. The microspheres thereby produced are as follows: yield of 91%, the average size (C), Tg (C), compressive strength (B), sphericity of 0.9, bulk density of 0.6 g/cm$^3$, and swelling (C).

Example 4

Dicyclopentadiene is heated in an autoclave to 150° C., is held at the predetermined temperature for 60 minutes, and is cooled down to room temperature. Polymer stabilizers 702 (0.30 wt. %) and 168 (0.50 wt. %), and a radical initiator B (1.0 wt. %) are added to the resulting mixture. Catalyst N5a (0.0132 wt. %) is added at 10° C. The resulting mixture is stirred for 2 minutes, and thereafter is introduced as a laminar flow into water (a polymer mixture/water-and-surfactant ratio being 0.05) containing a surfactant of sodium dodecyl sulfate (0.1 wt. %) at 55° C. While constantly stirring, the water is heated up to 60° C. and is held for 45 minutes. Microspheres are separated from the water, are heated up to 200° C., and are held at this temperature under nitrogen atmosphere for 30 minutes. The microspheres thereby produced are as follows: yield of 89%, average size (A), Tg (A), compressive strength (A), sphericity of 0.9, bulk density of 0.6 g/cm$^3$, and swelling (A).

Example 5

Dicyclopentadiene is heated in an autoclave to 150° C., is held at the predetermined temperature for 160 minutes, and is cooled down to room temperature. Polymer stabilizers 1010 (0.20 wt. %), TNPP (0.50 wt. %) and 292 (0.50 wt. %), and a radical initiator B (1.0 wt. %) are added to the resulting mixture. Catalyst N1 (0.0099 wt. %) is added at 50° C. The resulting mixture is stirred for 5 minutes, and thereafter is introduced as a laminar flow into water (a polymer mixture/water-and-surfactant ratio being 0.1) containing a surfactant of benzalkonium chloride (0.1 wt. %) at 30° C. While constantly stirring, the water is heated up to 50° C. and is held for 10 minutes. Microspheres are separated from the water, are heated up to 200° C., and are held at this temperature under nitrogen atmosphere for 360 minutes. The microspheres thereby produced are as follows: yield of 97%, average size (B), Tg (C), compressive strength (B), sphericity of 0.9, bulk density of 0.6 g/cm$^3$, and swelling (C).

Example 6

Dicyclopentadiene is heated in an autoclave to 160° C., is held at the predetermined temperature for 180 minutes, and is cooled down to room temperature. Polymer stabilizers 330 (0.50 wt. %) and 168 (1.00 wt. %), and radical initiators BC-FF (1.5 wt. %) and 30 (2.5 wt. %) are added to the resulting mixture. Catalyst N14a (0.0087 wt. %) is added at 25° C. The resulting mixture is stirred for 10 minutes, and thereafter is introduced as a laminar flow into water (a polymer mixture/water-and-surfactant ratio being 0.15) containing a surfactant of octenidine hydrochloride (0.1 wt. %) at 40° C. While constantly stirring, the water is heated up to 100° C. and is held for 15 minutes. Microspheres are separated from the water, are heated up to 250° C., and are held at this temperature under nitrogen atmosphere for 45 minutes. The microspheres thereby produced are as follows: yield of 97%, average size (A), Tg (A), compressive strength (A), sphericity of 0.9, bulk density of 0.6 g/cm$^3$, and swelling (A).

Example 7

Dicyclopentadiene is heated in an autoclave to 150° C., is held at the predetermined temperature for 240 minutes, and is cooled down to room temperature. Polymer stabilizers 1010 (0.40 wt. %), 168 (0.80 wt. %) and 770 (0.40 wt. %), and radical initiators B (1.0 wt. %) and 30 (2.0 wt. %) are added to the resulting mixture. Catalyst N17a (0.0088 wt. %) is added at 20° C. The resulting mixture is stirred for 5 minutes, and thereafter is introduced as a laminar flow into water (a polymer mixture/water-and-surfactant ratio being 0.1) containing a surfactant of cetyltrimethylammonium chloride (0.1 wt. %) at 35° C. While constantly stirring, the water is heated up to 60° C. and is held for 15 minutes. Microspheres are separated from the water, are heated up to 340° C., and are held at this temperature under nitrogen atmosphere for 10 minutes. The microspheres thereby produced are as follows: yield of 97%, average size (A), Tg (A), compressive strength (B), sphericity of 0.9, bulk density of 0.6 g/cm$^3$, and swelling (A).

Example 8

Dicyclopentadiene is heated in an autoclave to 150° C., is held at the predetermined temperature for 60 minutes, and is cooled down to room temperature. Polymer stabilizers 702 (0.20 wt. %), 168 (0.50 wt. %) and 123 (0.50 wt. %), and a radical initiator B (0.5 wt. %) are added to the resulting mixture. Catalyst N4 (0.0170 wt. %) is added at 25° C. The resulting mixture is stirred for 10 minutes, and thereafter is introduced as a laminar flow into water (a polymer mixture/water-and-surfactant ratio being 0.1) containing a surfactant of ammonium lauryl sulfate (0.25 wt. %) at 35° C. While constantly stirring, the water is heated up to 75° C. and is held for 30 minutes. Microspheres are separated from the water, are heated up to 150° C., and are held at this temperature under nitrogen atmosphere for 30 minutes. The microspheres thereby produced are as follows: yield of 95%, average size (B), Tg (C), compressive strength (B), sphericity of 0.9, bulk density of 0.6 g/cm$^3$, and swelling (C).

Example 9

Dicyclopentadiene is heated in an autoclave to 160° C., is held at the predetermined temperature for 120 minutes, and is cooled down to room temperature. Polymer stabilizers 1010 (0.20 wt. %), 168 (0.75 wt. %) and 292 (0.45 wt. %), and a radical initiator BC-FF (1.0 wt. %) are added to the resulting mixture. Catalyst N5 (0.0126 wt. %) is added at 10° C. The resulting mixture is stirred for 5 minutes, and thereafter is introduced as a laminar flow into water (a polymer mixture/water-and-surfactant ratio being 0.1) containing a surfactant of sodium dodecyl sulfate (0.1 wt. %) at 30° C. While constantly stirring, the water is heated up to 100° C. and is held for 15 minutes. Microspheres are separated from the water, are heated up to 200° C., and are held at this temperature under nitrogen atmosphere for 30 minutes. The microspheres thereby produced are as follows: yield of 97%, average size (A), Tg (C), compressive strength (B), sphericity of 0.9, bulk density of 0.6 g/cm$^3$, and swelling (C).

Example 10

Dicyclopentadiene is heated in an autoclave to 180° C., is held at the predetermined temperature for 60 minutes, and is cooled down to room temperature. Polymer stabilizers DPA (0.40 wt. %), 168 (0.50 wt. %) and 234 (0.20 wt. %), and radical initiators B (1.0 wt. %) and 30 (3.0 wt. %) are added to the resulting mixture. Catalyst N19a (0.0247 wt. %) is added at 0° C. The resulting mixture is stirred for 1 minute, and thereafter is introduced as a laminar flow into water (a polymer mixture/water-and-surfactant ratio being 0.1) containing a surfactant of cetyltrimethylammonium chloride (0.1 wt. %) at 35° C. While constantly stirring, the water is heated up to 80° C. and is held for 15 minutes. Microspheres are separated from the water, are heated up to 265° C., and are held at this temperature under nitrogen atmosphere for 60 minutes. The microspheres thereby produced are as follows: yield of 97%, average size (B), Tg (A), compressive strength (B), sphericity of 0.9, bulk density of 0.6 g/cm$^3$, and swelling (A).

Example 11

Dicyclopentadiene is heated in an autoclave to 150° C., is held at the predetermined temperature for 180 minutes, and is cooled down to room temperature. Polymer stabilizers 702 (0.50 wt. %) and 168 (0.50 wt. %), and a radical initiator BC-FF (2.0 wt. %) are added to the resulting mixture. Catalyst N2a (0.0167 wt. %) is added at 30° C. The resulting mixture is stirred for 20 minutes, and thereafter is introduced as a laminar flow into water (a polymer mixture/water-and-surfactant ratio being 0.1) containing a surfactant of sodium dodecyl sulfate (0.1 wt. %) at 40° C. While constantly stirring, the water is heated up to 70° C. and is held for 15 minutes. Microspheres are separated from the water, are heated up to 250° C., and are held at this temperature under nitrogen atmosphere for 30 minutes. The microspheres thereby produced are as follows: yield of 98%, average size (A), Tg (B), compressive strength (A), sphericity of 0.9, bulk density of 0.6 g/cm$^3$, and swelling (B).

Example 12

Dicyclopentadiene is heated in an autoclave to 160° C., is held at the predetermined temperature for 120 minutes, and is cooled down to room temperature. Polymer stabilizers 1010 (0.20 wt. %), 168 (0.50 wt. %) and 292 (0.50 wt. %), and radical initiators BC-FF (0.1 wt. %) and 30 (1.5 wt. %) are added to the resulting mixture. Catalyst N1a (0.0033 wt. %) is added at 30° C. The resulting mixture is stirred for 10 minutes, and thereafter is introduced as a laminar flow into water (a polymer mixture/water-and-surfactant ratio being 0.1) containing a surfactant of cetyltrimethylammonium chloride (0.1 wt. %) at 40° C. While constantly stirring, the water is heated up to 70° C. and is held for 15 minutes. Microspheres are separated from the water, are heated up to 280° C., and are held at this temperature under nitrogen atmosphere for 1 minute. The microspheres thereby produced are as follows: yield of 90%, the average size (C), Tg (B), compressive strength (B), sphericity of 0.9, bulk density of 0.6 g/cm$^3$, and swelling (B).

Example 13

Dicyclopentadiene is heated in an autoclave to 155° C., is held at the predetermined temperature for 280 minutes, and is cooled down to room temperature. Polymer stabilizer 702 (0.10 wt. %) and radical initiators BC-FF (1.0 wt. %) and 30 (1.0 wt. %) are added to the resulting mixture. Catalyst N1c (0.0116 wt. %) is added at 20° C. The resulting mixture is stirred for 5 minutes, and thereafter is introduced as a laminar flow into water (a polymer mixture/water-and-surfactant ratio being 0.1) containing a surfactant of cetyltrimethylammonium chloride (0.1 wt. %) at 30° C. While constantly stirring, the water is heated up to 50° C. and is held for 40 minutes. Microspheres are separated from the water, are heated up to 310° C., and are held at this temperature under nitrogen atmosphere for 5 minutes. The microspheres thereby produced are as follows: yield of 93%, average size (B), Tg (A), compressive strength (B), sphericity of 0.9, bulk density of 0.6 g/cm$^3$, and swelling (A).

Example 14

Dicyclopentadiene is heated in an autoclave to 150° C., is held at the predetermined temperature for 60 minutes, and is cooled down to room temperature. Polymer stabilizers 1010 (0.37 wt. %), 168 (0.10 wt. %) and 770 (0.47 wt. %), and radical initiators B (1.0 wt. %) and 30 (1.0 wt. %) are added to the resulting mixture. Catalyst N6a (0.0061 wt. %) is added at 25° C. The resulting mixture is stirred for 10 minutes, and thereafter is introduced as a laminar flow into water (a polymer mixture/water-and-surfactant ratio being 0.1) containing a surfactant of cetyltrimethylammonium chloride (0.1 wt. %) at 40° C. While constantly stirring, the water is heated up to 80° C. and is held for 15 minutes. Microspheres are separated from the water, are heated up to 300° C., and are held at this temperature under nitrogen atmosphere for 30 minutes. The microspheres thereby produced are as follows: yield of 93%, average size (C), Tg (A), compressive strength (B), sphericity of 0.9, bulk density of 0.6 g/cm³, and swelling (A).

Example 15

Dicyclopentadiene is heated in an autoclave to 150° C., is held at the predetermined temperature for 240 minutes, and is cooled down to room temperature. Polymer stabilizers 702 (0.50 wt. %) and 168 (0.50 wt. %), and radical initiators BC-FF (1.0 wt. %) and TPM (1.0 wt. %) are added to the resulting mixture. Catalyst N9a (0.0023 wt. %) is added at 15° C. The resulting mixture is stirred for 10 minutes, and thereafter is introduced as a laminar flow into water (a polymer mixture/water-and-surfactant ratio being 0.1) containing a surfactant of cetyltrimethylammonium chloride (0.1 wt. %) at 35° C. While constantly stirring, the water is heated up to 80° C. and is held for 15 minutes. Microspheres are separated from the water, are heated up to 270° C., and are held at this temperature under nitrogen atmosphere for 30 minutes. The microspheres thereby produced are as follows: yield of 97%, average size (B), Tg (C), compressive strength (B), sphericity of 0.9, bulk density of 0.6 g/cm³, and swelling (C).

Example 16

Dicyclopentadiene is heated in an autoclave to 170° C., is held at the predetermined temperature for 180 minutes, and is cooled down to room temperature. Polymer stabilizers 5057 (0.20 wt. %), 168 (0.40 wt. %) and 770 (0.40 wt. %), and a radical initiator BC-FF (1.0 wt. %) are added to the resulting mixture. Catalyst N2 (0.0124 wt. %) is added at 25° C. The resulting mixture is stirred for 10 minutes, and thereafter is introduced as a laminar flow into water (a polymer mixture/water-and-surfactant ratio being 0.1) containing a surfactant of cetyltrimethylammonium chloride (0.2 wt. %) at 35° C. While constantly stirring, the water is heated up to 95° C. and is held for 5 minutes. Microspheres are separated from the water, are heated up to 270° C., and are held at this temperature under nitrogen atmosphere for 45 minutes. The microspheres thereby produced are as follows: yield of 98%, average size (B), Tg (C), compressive strength (A), sphericity of 0.9, bulk density of 0.6 g/cm³, and swelling (C).

Example 17

Dicyclopentadiene is heated in an autoclave to 160° C., is held at the predetermined temperature for 360 minutes, and is cooled down to room temperature. Polymer stabilizers 1010 (0.35 wt. %), 327 (0.20 wt. %) and 770 (0.50 wt. %), and a radical initiator BC-FF (0.5 wt. %) are added to the resulting mixture. Catalyst N10a (0.0072 wt. %) is added at 5° C. The resulting mixture is stirred for 10 minutes, and thereafter is introduced as a laminar flow into water (a polymer mixture/water-and-surfactant ratio being 0.1) containing a surfactant of sodium dodecyl sulfate (0.1 wt. %) at 35° C. While constantly stirring, the water is heated up to 95° C. and is held for 15 minutes. Microspheres are separated from the water, are heated up to 170° C., and are held at this temperature under nitrogen atmosphere for 30 minutes. The microspheres thereby produced are as follows: yield of 98%, average size (A), Tg (C), compressive strength (B), sphericity of 0.9, bulk density of 0.6 g/cm³, and swelling (C).

Example 18

Dicyclopentadiene is heated in an autoclave to 160° C., is held at the predetermined temperature for 160 minutes, and is cooled down to room temperature. Polymer stabilizers 330 (0.40 wt. %) and TNPP (0.80 wt. %), and a radical initiator BC-FF (0.5 wt. %) are added to the resulting mixture. Catalyst N11a (0.0102 wt. %) is added at 25° C. The resulting mixture is stirred for 10 minutes, and thereafter is introduced as a laminar flow into water (a polymer mixture/water-and-surfactant ratio being 0.1) containing a surfactant of cetyltrimethylammonium chloride (0.1 wt. %) at 35° C. While constantly stirring, the water is heated up to 95° C. and is held for 15 minutes. Microspheres are separated from the water, are heated up to 200° C., and are held at this temperature under nitrogen atmosphere for 60 minutes. The microspheres thereby produced are as follows: yield of 99%, average size (A), Tg (C), compressive strength (B), sphericity of 0.9, bulk density of 0.6 g/cm³, and swelling (C).

Example 19

Dicyclopentadiene is heated in an autoclave to 190° C., is held at the predetermined temperature for 50 minutes, and is cooled down to room temperature. Polymer stabilizers 702 (0.45 wt. %), 168 (0.45 wt. %) and 770 (0.40 wt. %), and radical initiators BC-FF (0.5 wt. %) and 30 (2.0 wt. %) are added to the resulting mixture. Catalyst N3b (0.0072 wt. %) is added at 30° C. The resulting mixture is stirred for 10 minutes, and thereafter is introduced as a laminar flow into water (a polymer mixture/water-and-surfactant ratio being 0.1) containing a surfactant of cetyltrimethylammonium chloride (0.1 wt. %) at 40° C. While constantly stirring, the water is heated up to 60° C. and is held for 15 minutes. Microspheres are separated from the water, are heated up to 250° C., and are held at this temperature under nitrogen atmosphere for 30 minutes. The microspheres thereby produced are as follows: yield of 97%, average size (B), Tg (A), compressive strength (B), sphericity of 0.9, bulk density of 0.6 g/cm³, and swelling (A).

Example 20

Dicyclopentadiene is heated in an autoclave to 155° C., is held at the predetermined temperature for 280 minutes, and is cooled down to room temperature. Polymer stabilizers 168 (0.45 wt. %) and 168 (0.45 wt. %), and radical initiators BC-FF (1.0 wt. %) and 30 (1.5 wt. %) are added to the resulting mixture. Catalyst N5b (0.0131 wt. %) is added at 30° C. The resulting mixture is stirred for 10 minutes, and thereafter is introduced as a laminar flow into water (a polymer mixture/water-and-surfactant ratio being 0.1) containing a surfactant of cetyltrimethylammonium chloride (0.1 wt. %) at 35° C. While constantly stirring, the water is heated up to 95° C. and is held for 15 minutes. Microspheres are separated from the water, are heated up to 260° C., and are held at this temperature under nitrogen atmosphere for 30 minutes. The microspheres thereby produced are as follows: yield of 97%, average size (B), Tg (A), compressive strength (B), sphericity of 0.9, bulk density of 0.6 g/cm³, and swelling (A).

Example 21

Dicyclopentadiene is heated in an autoclave to 160° C., is held at the predetermined temperature for 180 minutes, and is cooled down to room temperature. Polymer stabilizers 1010 (0.36 wt. %), 168 (0.72 wt. %) and 123 (0.45 wt. %), and the radical initiators B (0.1 wt. %) and 30 (2.0 wt. %) are added to the resulting mixture. Catalyst N12a (0.0085 wt. %) is added at 25° C. The resulting mixture is stirred for 10 minutes, and thereafter is introduced as a laminar flow into water (a polymer mixture/water-and-surfactant ratio being 0.1) containing a surfactant of sodium dodecyl sulfate (0.1 wt. %) at 35° C. While constantly stirring, the water is heated up to 70° C. and is held for 60 minutes. Microspheres are separated from the water, are heated up to 270° C., and are held at this temperature under nitrogen atmosphere for 30 minutes. The microspheres thereby produced are as follows: yield of 97%, average size (A), Tg (A), compressive strength (B), sphericity of 0.9, bulk density of 0.6 g/cm³, and swelling (A).

Example 22

Dicyclopentadiene is heated in an autoclave to 160° C., is held at the predetermined temperature for 120 minutes, and is cooled down to room temperature. Polymer stabilizers 703 (0.45 wt. %) and 770 (0.45 wt. %), and a radical initiator BC-FF (1.0 wt. %) are added to the resulting mixture. Catalyst N15a (0.0106 wt. %) is added at 25° C. The resulting mixture is stirred for 10 minutes, and thereafter is introduced as a laminar flow into water (a polymer mixture/water-and-surfactant ratio being 0.1) containing a surfactant of octenidine hydrochloride (0.1 wt. %) at 40° C. While constantly stirring, the water is heated up to 70° C. and is held for 15 minutes. Microspheres are separated from the water, are heated up to 170° C., and are held at this temperature under nitrogen atmosphere for 30 minutes. The microspheres thereby produced are as follows: yield of 96%, average size (B), Tg (A), compressive strength (A), sphericity of 0.9, bulk density of 0.6 g/cm³, and swelling (A).

Example 23

Dicyclopentadiene is heated in an autoclave to 150° C., is held at the predetermined temperature for 60 minutes, and is cooled down to room temperature. Polymer stabilizers 1010 (0.02 wt. %), 168 (0.04 wt. %) and 770 (0.04 wt. %), and a radical initiator BC-FF (1.0 wt. %) are added to the resulting mixture. Catalyst N4a (0.0130 wt. %) is added at 25° C. The resulting mixture is stirred for 10 minutes, and thereafter is introduced as a laminar flow into water (a polymer mixture/water-and-surfactant ratio being 0.1) containing a surfactant of cetyltrimethylammonium chloride (0.1 wt. %) at 35° C. While constantly stirring, the water is heated up to 80° C. and is held for 15 minutes. Microspheres are separated from the water, are heated up to 200° C., and are held at this temperature under nitrogen atmosphere for 30 minutes. The microspheres thereby produced are as follows: yield of 92%, average size (A), Tg (C), compressive strength (B), sphericity of 0.9, bulk density of 0.6 g/cm³, and swelling (C).

Example 24

Dicyclopentadiene is heated in an autoclave to 155° C., is held at the predetermined temperature for 180 minutes, and is cooled down to room temperature. Polymer stabilizers 14 (0.40 wt. %) and 168 (0.80 wt. %), and a radical initiator B (0.1 wt. %) are added to the resulting mixture. Catalyst N3 (0.0098 wt. %) is added at 25° C. The resulting mixture is stirred for 10 minutes, and thereafter is introduced as a laminar flow into water (a polymer mixture/water-and-surfactant ratio being 0.1) containing a surfactant of benzalkonium chloride (0.1 wt. %) at 30° C. While constantly stirring, the water is heated up to 80° C. and is held for 15 minutes. Microspheres are separated from the water, are heated up to 180° C., and are held at this temperature under nitrogen atmosphere for 30 minutes. The microspheres thereby produced are as follows: yield of 98%, average size (A), Tg (C), compressive strength (B), sphericity of 0.9, bulk density of 0.6 g/cm³, and swelling (C).

Example 25

Dicyclopentadiene is heated in an autoclave to 150° C., is held at the predetermined temperature for 60 minutes, and is cooled down to room temperature. Polymer stabilizers 1010 (0.50 wt. %), 168 (0.50 wt. %) and 770 (0.50 wt. %), and radical initiators BC-FF (1.0 wt. %) and 30 (2.0 wt. %) are added to the resulting mixture. Catalyst N16a (0.0086 wt. %) is added at 30° C. The resulting mixture is stirred for 1 minute, and thereafter is introduced as a laminar flow into water (a polymer mixture/water-and-surfactant ratio being 0.1) containing a surfactant of sodium dodecyl sulfate (0.1 wt. %) at 35° C. While constantly stirring, the water is heated up to 75° C. and is held for 20 minutes. Microspheres are separated from the water, are heated up to 260° C., and are held at this temperature under nitrogen atmosphere for 30 minutes. The microspheres thereby produced are as follows: yield of 97%, average size (A), Tg (A), compressive strength (A), sphericity of 0.9, bulk density of 0.6 g/cm³, and swelling (A).

Example 26

Dicyclopentadiene is heated in an autoclave to 155° C., is held at the predetermined temperature for 300 minutes, and is cooled down to room temperature. Polymer stabilizers 330 (0.45 wt. %), TNPP (0.45 wt. %) and 292 (0.45 wt. %), and radical initiators BC-FF (1.0 wt. %) and 30 (1.0 wt. %) are added to the resulting mixture. Catalyst N20a (0.0053 wt. %) is added at 15° C. The resulting mixture is stirred for 10 minutes, and thereafter is introduced as a laminar flow into water (a polymer mixture/water-and-surfactant ratio being 0.1) containing a surfactant of cetyltrimethylammonium chloride (0.1 wt. %) at 50° C. While constantly stirring, the water is heated up to 70° C. and is held for 15 minutes. Microspheres are separated from the water, are heated up to 255° C., and are held at this temperature under nitrogen atmosphere for 30 minutes. The microspheres thereby produced are as follows: yield of 92%, average size (C), Tg (A), compressive strength (B), sphericity of 0.9, bulk density of 0.6 g/cm³, and swelling (A).

Example 27

Dicyclopentadiene is heated in an autoclave to 155° C., is held at the predetermined temperature for 300 minutes, and is cooled down to room temperature. Polymer stabilizers 702 (0.40 wt. %) and 327 (0.20 wt. %), and a radical initiator B (2.0 wt. %) are added to the resulting mixture. Catalyst N1b (0.0069 wt. %) is added at 30° C. The resulting mixture is stirred for 10 minutes, and thereafter is introduced as a laminar flow into water (a polymer mixture/water-and-surfactant ratio being 0.1) containing a surfactant of benzalkonium chloride (0.2 wt. %) at 40° C. While constantly stirring, the water is heated up to 75° C. and is held for 15 minutes. Microspheres are separated from the water, are heated up to 200° C., and are held at this temperature under nitrogen atmosphere for 120 minutes. The microspheres thereby produced are as follows: yield of 95%, average size (C), Tg (C), compressive strength (B), sphericity of 0.9, bulk density of 0.6 g/cm$^3$, and swelling (C).

Example 28

Dicyclopentadiene is heated in an autoclave to 175° C., is held at the predetermined temperature for 180 minutes, and is cooled down to room temperature. Polymer stabilizers 330 (0.40 wt. %), 168 (0.50 wt. %) and 770 (0.50 wt. %), and a radical initiator B (1.0 wt. %) are added to the resulting mixture. Catalyst N13a (0.0105 wt. %) is added at 25° C. The resulting mixture is stirred for 10 minutes, and thereafter is introduced as a laminar flow into water (a polymer mixture/water-and-surfactant ratio being 0.1) containing a surfactant of octenidine hydrochloride (0.1 wt. %) at 40° C. While constantly stirring, the water is heated up to 70° C. and is held for 15 minutes. Microspheres are separated from the water, are heated up to 220° C., and are held at this temperature under nitrogen atmosphere for 30 minutes. The microspheres thereby produced are as follows: yield of 97%, average size (A), Tg (B), compressive strength (A), sphericity of 0.9, bulk density of 0.6 g/cm$^3$, and swelling (B).

Example 29

Dicyclopentadiene is heated in an autoclave to 220° C., is held at the predetermined temperature for 15 minutes, and is cooled down to room temperature. Polymer stabilizers 1010 (1.50 wt. %), TNPP (1.00 wt. %) and 123 (1.50 wt. %), and a radical initiator BC-FF (1.0 wt. %) are added to the resulting mixture. Catalyst N18a (0.0134 wt. %) is added at 10° C. The resulting mixture is stirred for 5 minutes, and thereafter is introduced as a laminar flow into water (a polymer mixture/water-and-surfactant ratio being 0.1) containing a surfactant of cetyltrimethylammonium chloride (0.2 wt. %) at 35° C. While constantly stirring, the water is heated up to 100° C. and is held for 15 minutes. Microspheres are separated from the water, are heated up to 200° C., and are held at this temperature under nitrogen atmosphere for 30 minutes. The microspheres thereby produced are as follows: yield of 96%, average size (A), Tg (C), compressive strength (B), sphericity of 0.9, bulk density of 0.6 g/cm$^3$, and swelling (C).

Example 30

Dicyclopentadiene is heated in an autoclave to 155° C., is held at the predetermined temperature for 300 minutes, and is cooled down to room temperature. Polymer stabilizers 354 (1.00 wt. %) and 770 (0.50 wt. %), and radical initiators BC-FF (1.0 wt. %) and 30 (1.0 wt. %) are added to the resulting mixture. Catalyst N2b (0.0070 wt. %) is added at 45° C. The resulting mixture is stirred for 10 minutes, and thereafter is introduced as a laminar flow into water (a polymer mixture/water-and-surfactant ratio being 0.1) containing a surfactant of sodium dodecyl sulfate (0.1 wt. %) at 35° C. While constantly stirring, the water is heated up to 95° C. and is held for 15 minutes. Microspheres are separated from the water, are heated up to 275° C., and are held at this temperature under nitrogen atmosphere for 30 minutes. The microspheres thereby produced are as follows: yield of 97%, average size (A), Tg (A), compressive strength (B), sphericity of 0.9, bulk density of 0.6 g/cm$^3$, and swelling (A).

Example 31

Dicyclopentadiene is heated in an autoclave to 200° C., is held at the predetermined temperature for 60 minutes, and is cooled down to room temperature. Polymer stabilizers 1010 (0.40 wt. %), TNPP (0.40 wt. %) and 770 (0.40 wt. %), and a radical initiator BC-FF (1.0 wt. %) are added to the resulting mixture. Catalyst N8a (0.0103 wt. %) is added at 25° C. The resulting mixture is stirred for 10 minutes, and thereafter is introduced as a laminar flow into water (a polymer mixture/water-and-surfactant ratio being 0.1) containing a surfactant of cetyltrimethylammonium chloride (0.2 wt. %) at 35° C. While constantly stirring, the water is heated up to 70° C. and is held for 15 minutes. Microspheres are separated from the water, are heated up to 170° C., and are held at this temperature under nitrogen atmosphere for 240 minutes. The microspheres thereby produced are as follows: yield of 98%, average size (B), Tg (C), compressive strength (B), sphericity of 0.9, bulk density of 0.6 g/cm$^3$, and swelling (C).

Example 32

Dicyclopentadiene is heated in an autoclave to 165° C., is held at the predetermined temperature for 240 minutes, and is cooled down to room temperature. Polymer stabilizers 702 (0.37 wt. %), 168 (0.73 wt. %) and 770 (0.37 wt. %), and a radical initiator BC-FF (1.0 wt. %) are added to the resulting mixture. Catalyst N4b (0.0094 wt. %) is added at 30° C. The resulting mixture is stirred for 10 minutes, and thereafter is introduced as a laminar flow into water (a polymer mixture/water-and-surfactant ratio being 0.1) containing a surfactant of sodium dodecyl sulfate (0.5 wt. %) at 40° C. While constantly stirring, the water is heated up to 80° C. and is held for 15 minutes. Microspheres are separated from the water, are heated up to 200° C., and are held at this temperature under nitrogen atmosphere for 60 minutes. The microspheres thereby produced are as follows: yield of 96%, average size (C), Tg (C), compressive strength (B), sphericity of 0.9, bulk density of 0.6 g/cm$^3$, and swelling (C).

Example 33

Dicyclopentadiene is heated in an autoclave to 155° C., is held at the predetermined temperature for 300 minutes, and is cooled down to room temperature. Polymer stabilizers DPPD (0.37 wt. %), 168 (0.73 wt. %) and 770 (0.37 wt. %), and a radical initiator BC-FF (1.0 wt. %) are added to the resulting mixture. Catalyst N1 (0.0095 wt. %) is added at 30° C. The resulting mixture is stirred for 10 minutes, and thereafter is introduced as a laminar flow into water (a polymer mixture/water-and-surfactant ratio being 0.1) containing a surfactant of sodium dodecyl sulfate (0.4 wt. %) at 45° C. While constantly stirring, the water is heated up to 100° C. and is held for 15 minutes. Microspheres are separated from the water, are heated up to 270° C., and are held at this temperature under nitrogen atmosphere for 60 minutes. The microspheres thereby produced are as follows:

yield of 96%, average size (C), Tg (B), compressive strength (B), sphericity of 0.9, bulk density of 0.6 g/cm³, and swelling (C).

INDUSTRIAL APPLICABILITY

As seen from the examples, the present technology allows for producing proppants with high physical and mechanical properties required for implementation of the technology of formation hydraulic fracturing and hydrocarbon production, primarily, those properties being thermal resistance and strength.

The invention claimed is:
1. A method for producing a proppant, including obtaining a mixture of oligocyclopentadienes by heating dicyclopentadiene to a temperature of 150-220° C. and holding at this temperature for 15-360 minutes, cooling the mixture down to 20-50° C., sequentially adding the following components to the resulting mixture of oligocyclopentadienes: at least one polymer stabilizers selected from the following compounds: tetrakis[methylene(3,5-di-tert-butyl-4-hydroxyhydrocinnamate)]methane, 2,6-di-tert-butyl-4-(dimethylamino)phenol, 1,3,5-trimethyl-2,4,6-tris(3,5-di-tert-butyl-4-hydroxybenzyl)benzene, tris(4-tert-butyl-3-hydroxy-2,6-dimethylbenzyl)isocyanurate, 3,5-di-tert-butyl-4-hydroxyanisole, 4,4'-methylenebis(2,6-di-tert-butylphenol), diphenylamine, para-di-tert-butylphenylenediamine, N,N'-diphenyl-1,4-phenylenediamine, tris(2,4-di-tert-butylphenyl)phosphite, tris(nonylphenyl)phosphite, bis(2,2,6,6-tetramethyl-4-piperidinyl)sebacate, bis(1-octyloxy-2,2,6,6-tetramethyl-4-piperidinyl)sebacate, bis(1-methyl-2,2,6,6-tetramethyl-4-piperidinyl)sebacate, 2-tert-butyl-6-(5-chloro-2H-benzotriazol-2-yl)-4-methylphenol, and 2-(2H-benzotriazol-2-yl)-4,6-bis(1-methyl-1-phenyl)phenol; at least one radical initiators selected from the following compounds or mixtures thereof: di-tert-butyl peroxide, dicumyl peroxide, 2,3-dimethyl-2,3-diphenylbutane, and triphenylmethane; and a catalyst which is a compound of the following general formula:

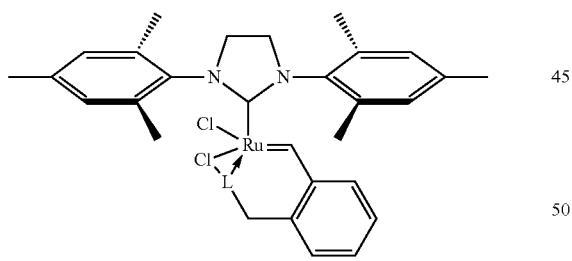

wherein a substituent L is selected from the following group:

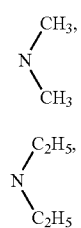 N1

 N2

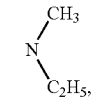 N3

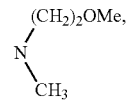 N4

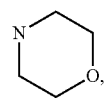 N5

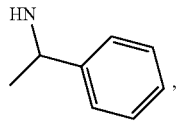 N5b

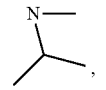 N1a

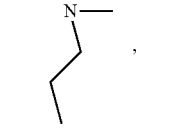 N6a

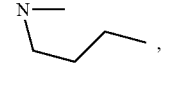 N11a

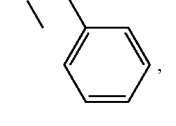 N16a

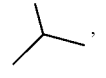 N1b

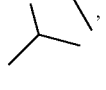 N2a

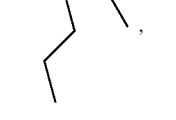 N7a

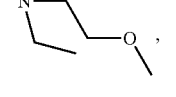 N12a

N17a

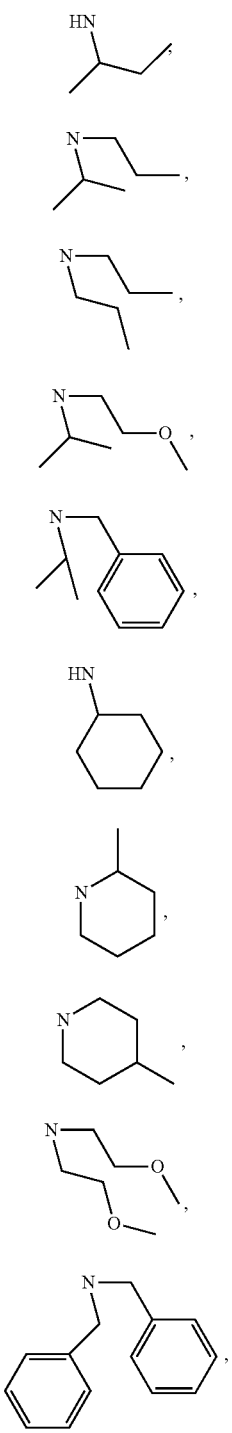

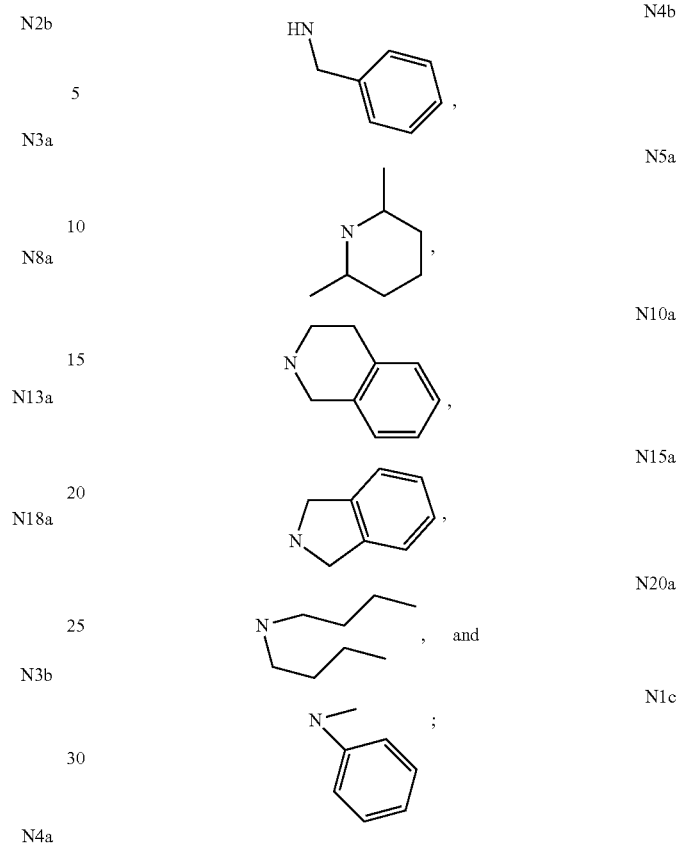

wherein the components of the polymer matrix are present in the following amounts, wt. %:
the at least one polymer stabilizer 0.1-3;
the at least one radical initiator 0.1-4;
the catalyst 0.001-0.02;
the mixture of oligocyclopentadienes being the balance,
the resulting polymer matrix is held at a temperature of 20-50° C. for 1-40 minutes, and thereafter is introduced as a laminar flow into an aqueous solution preheated to a temperature not lower than that of the matrix, said aqueous solution containing a surfactant which is cetyl-trimethylammonium chloride or sodium dodecyl sulfate or ammonium lauryl sulfate or sodium lauryl sarcosinate or octenidine hydrochloride or benzalkonium chloride; while constantly stirring, the aqueous solution is heated up to 50-100° C., while still continuing stirring for 1-60 minutes; microspheres formed are separated from the aqueous solution, are heated in an inert gas atmosphere to a temperature of 150-340° C. and are held under said atmosphere at this temperature for 1-360 minutes.

2. A polymer proppant, characterized in that it is produced by the method according to claim 1.

* * * * *